(12) United States Patent
Morishima et al.

(10) Patent No.: US 8,036,004 B2
(45) Date of Patent: Oct. 11, 2011

(54) UNINTERRUPTIBLE POWER SUPPLY WITH TOTAL ISOLATION

(75) Inventors: Yoichi Morishima, Houston, TX (US); Jeff Ristow, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 26 days.

(21) Appl. No.: 12/243,715

(22) Filed: Oct. 1, 2008

(65) Prior Publication Data
US 2010/0080021 A1    Apr. 1, 2010

(51) Int. Cl.
*H02H 7/122*    (2006.01)
(52) U.S. Cl. ........................................ 363/55
(58) Field of Classification Search ............ 363/34, 363/37, 40, 44, 26, 71, 95, 96, 55; 307/64, 307/66
See application file for complete search history.

(56) References Cited

U.S. PATENT DOCUMENTS

| | | | | |
|---|---|---|---|---|
| 4,251,857 A * | 2/1981 | Shelly | | 363/26 |
| 4,287,557 A * | 9/1981 | Brehse | | 363/95 |
| 4,336,584 A * | 6/1982 | Careglio | | 363/28 |
| 4,529,925 A * | 7/1985 | Tanaka et al. | | 323/207 |
| 4,673,825 A * | 6/1987 | Raddi et al. | | 307/66 |
| 4,860,185 A * | 8/1989 | Brewer et al. | | 363/41 |
| 5,031,088 A * | 7/1991 | Tanaka | | 363/71 |
| 5,182,702 A * | 1/1993 | Hiramatsu et al. | | 363/132 |
| 5,513,088 A * | 4/1996 | Williamson | | 363/21.18 |
| 5,602,462 A * | 2/1997 | Stich et al. | | 323/258 |
| 5,610,451 A * | 3/1997 | Symonds | | 307/66 |
| 5,852,554 A * | 12/1998 | Yamamoto | | 363/71 |
| 6,184,593 B1* | 2/2001 | Jungreis | | 307/64 |
| 6,218,744 B1* | 4/2001 | Zahrte et al. | | 307/64 |
| 6,304,006 B1* | 10/2001 | Jungreis | | 307/64 |
| 6,940,735 B2* | 9/2005 | Deng et al. | | 363/37 |
| 7,174,261 B2* | 2/2007 | Gunn et al. | | 702/62 |
| 7,372,177 B2* | 5/2008 | Colombi et al. | | 307/64 |
| 7,599,196 B2* | 10/2009 | Alexander | | 363/13 |

* cited by examiner

*Primary Examiner* — Adolf Berhane
*Assistant Examiner* — Yemane Mehari
(74) *Attorney, Agent, or Firm* — Westerman, Hattori, Daniels & Adrian, LLP

(57) ABSTRACT

An uninterruptible power supply includes an isolation transformer having dual primary windings. The secondary winding generates an output voltage based on the magnetic field generated in one of the dual primary windings. A first primary winding is coupled to an inverter circuit that receives an alternating current input voltage and applies a clean and filter alternating current to the first primary winding. A second primary winding is coupled to a bypass circuit that applies a bypass voltage when the inverter circuit is in a failure state. The power supply also includes a compensation circuit to maintain the output voltage at a desired level.

17 Claims, 3 Drawing Sheets

UNINTERRUPTIBLE POWER SUPPLY WITH TOTAL ISOLATION

BACKGROUND

1. Field of the Invention

The present invention relates to power supplies for electronic devices. More particularly, the present invention relates to an uninterruptible power supply to provide power to critical equipment.

2. Discussion of the Related Art

Uninterruptible power supplies (UPSs) provide power to critical equipment that cannot experience any break in service. In other words, even a short duration brownout or blackout is unacceptable. Examples of such equipment include computer servers, computer networks, telecommunication electronics, medical devices, security networks, and the like. Regulated power is available no matter the status of the power supply.

Isolated power is important for these devices so that the input power is isolated from the output power. In short, UPSs use an isolation transformer to provide clean power to the device. An isolation transformer may have the same output voltage as input voltage. Isolation of the input and output power also prevents mutual interference, and may be required under certain conditions.

A device or equipment using a conventional UPS may include two modes of operation. First is an online mode using alternating current (AC) power applied to the primary winding. The online mode converts DC power that is rectified from an AC power input. The output power from the UPS may be reduced because of loss in the converting process.

The other mode may be called a bypass mode. If the online inverter circuit fails to provide power to the secondary winding, or load side, then a bypass circuit ensures power is provided from the power supply. The bypass mode can be implemented in two ways. One bypass mode configures the bypass power directly to the output power, thereby "bypassing" the transformer entirely. This mode does not isolate the input bypass power from the output power. If the bypass power is connected directly to the output, then any power spikes will be transferred to the output side of the power supply because the bypass is not isolated.

The other mode for providing bypass power uses a switch to apply the power to the primary winding of the transformer. Drawbacks of this configuration include a voltage interruption during the switchover of power, the output of the inverter circuit needs to be the same voltage as the input, and pulse-width modulation limitations that raise the possibility of distortion, which makes it difficult to compensate the voltage to keep the output of the inverter circuit the same. In terms of supplying uninterrupted power, a transient timing issue exists as the power supply switches from online inverter mode to bypass mode. Further, the bypass and online inverter circuits are connected to the same winding. Thus, the bypass voltage needs to be the same as the output voltage. This aspect results in unregulated voltage going to the primary winding and no adjustment available for the output voltage.

In summary, measures exist to provide uninterruptible power to devices and equipment. These measures, however, reduce the effectiveness of the power supply to provide isolated power, or result in temporary loss of power when switching to a bypass mode. Thus, these approaches fail to provide totally isolated output power in an uninterrupted manner.

SUMMARY

Accordingly, the disclosed embodiments of the present invention improve upon existing UPS technology and alleviate the drawbacks of conventional power supplies discussed above. The disclosed embodiments allow for greater control over the voltage applied to the primary windings and reduce any potential lapse in power during transition from online inverter mode to bypass mode. The disclosed embodiments perform these tasks while keeping the input power isolated from the output power.

The disclosed embodiments incorporate a double primary winding configuration for each mode. The primary windings fit each side's requirements. The configuration for the bypass mode may not be the same as one for the AC online inverter mode. Thus, any switchover from one mode to the other occurs continuously and without any interruption in service. Further, the disclosed embodiments include a circuit to control the output voltage in the online inverter mode based on the load condition.

As discussed above, a UPS device usually includes an online inverter circuit and a bypass circuit. The UPS device also may have a battery backup circuit. The online inverter circuit includes an AC-DC-AC converter that provides better quality power to the primary winding. The online inverter circuit takes an AC input and converts it to direct current (DC) power. The DC power is reconverted to AC power to supply "good" quality power. AC power is desirable to utilize the transformer in the power supply.

According to the disclosed embodiments, the output voltage is totally isolated from the AC input and bypass side of the power supply. The output voltage provided by the secondary winding while in the AC online inverter mode will be compensated output voltage by using the feedback of load current information. The disclosed embodiments also keep the desired sine waveforms for the alternating current by adjusting the switching pattern.

During the bypass mode, the disclosed embodiments isolate the output voltage from the AC input. Any surge voltage experienced within the power supply is isolated. Further, when in bypass mode, the voltage source differs from the source in the AC input side, which results in a different voltage level coming to the primary windings. The disclosed embodiments, however, provides the same output voltage via the secondary winding despite these differences.

According to the disclosed embodiments, an uninterruptible power supply is disclosed. The uninterruptible power supply includes an isolation transformer having dual primary windings and a secondary winding to supply an output voltage. A first winding of the dual primary windings is coupled to an inverter circuit that receives an alternating current input voltage. A second winding of the dual primary windings is coupled to a bypass circuit that receives a bypass voltage. Voltage is applied to the second winding upon failure of the inverter circuit to generate the output voltage without interruption.

Further according to the disclosed embodiments, an uninterruptible power supply includes an isolation transformer. The isolation transformer includes a first primary winding coupled to an inverter circuit that receives an alternating current input voltage, a second winding coupled to a bypass circuit that receives a bypass voltage, and a secondary winding. The inverter circuit includes a diode to generate a direct current voltage and an inverter to convert the direct current voltage to an alternating current voltage that receives a compensation voltage before being applied to the first primary winding. The alternating current voltage is cleaner than the alternating current input voltage. The uninterruptible power supply also includes a compensation circuit to detect a load current to the first primary winding and to generate the compensation voltage based on the load current. The uninterruptible power supply also includes an output coupled to the secondary winding to provide an output voltage corresponding to the bypass voltage or the alternating current voltage.

Further according to the disclosed embodiments, an isolation transformer is disclosed. The isolation transformer includes a first primary winding coupled to an inverter circuit. The inverter circuit provides an alternating current voltage to the first primary winding based on an alternating current input voltage. The isolation transformer also includes a second primary winding coupled to a bypass circuit to provide a bypass voltage. The isolation transformer also includes a secondary winding to generate an output voltage without interruption according to the first primary winding or the second primary winding. The second primary winding is used upon failure of the first primary winding.

Further according to the disclosed embodiments, a method for supplying power without interruption is disclosed. The method includes determining whether an inverter circuit is in a failure state. The method also includes applying an alternating current voltage using the inverter circuit to a first primary winding of an isolation transformer if the inverter circuit is not in the failure state. The method also includes applying a bypass voltage to a second primary winding of the isolation transformer if the inverter circuit is in the failure state. The method also includes generating an output voltage using a secondary winding of the isolation transformer based on the alternating current voltage or the bypass voltage.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

DETAILED DESCRIPTION OF THE PREFERRED EMBODIMENTS

Reference will now be made in detail to the preferred embodiments of the present invention. Examples of the preferred embodiments are illustrated in the accompanying drawings. The preferred embodiments may include those variations readily available to one skilled in the art.

Figure 1:
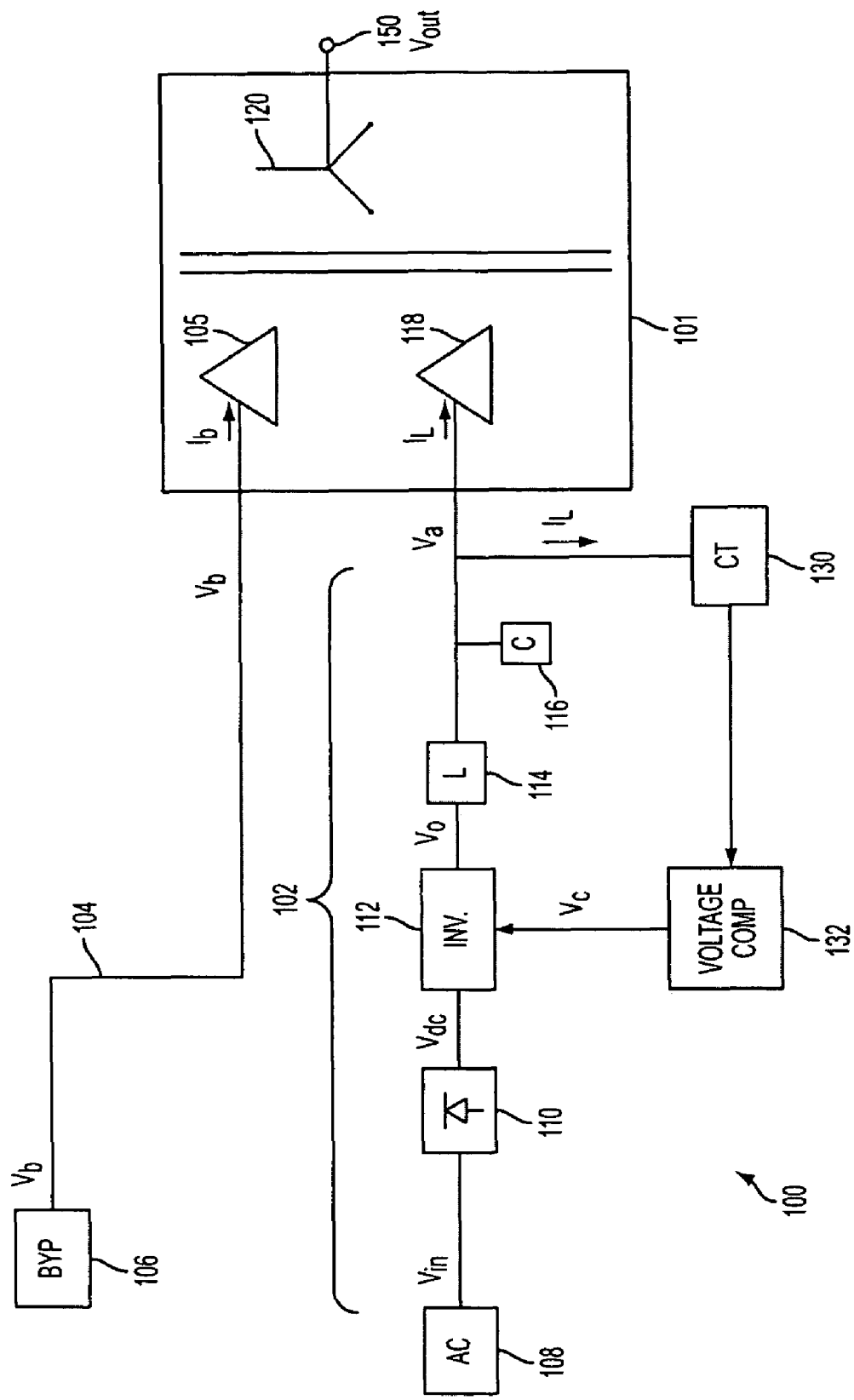
FIG. 1 illustrates a block diagram of a power supply to provide power without interruption according to the disclosed embodiments.

FIG. 1 depicts a power supply 100 according to the disclosed embodiments. Power supply 100 includes two circuits that supply power to isolation transformer 101. Isolation transformer 101 separates the power applied in the primary windings from the power generated in the secondary winding. Isolation transformer 101 also may not include a wire or coupling to the ground so that one must come across both terminals to receive a shock. The primary circuit to supply voltage to a primary winding is inverter circuit 102. If inverter circuit 102 fails or is off-line, then bypass circuit 104 applies voltage. Other circuits, such as a battery or backup circuit, also may be used, but or not shown. By using circuit 102 or 104, output voltage Vout is generated at output 150 of power supply 100.

AC power supply 108 provides input voltage Vin to circuit 102. Diode 110 converts input voltage Vin into rectified DC voltage Vdc. Rectified DC voltage Vdc is applied to inverter 112 to generate AC voltage Vo. This process of going through diode 110 and inverter 112 results in a cleaner waveform for voltage Vo, which means cleaner power will be applied to primary winding 118. The level of voltage Vo may be adjusted by a voltage Vc, disclosed in greater detail below.

Voltage Vo is filtered by a filter circuit comprising inductor 114 and capacitor 116 to generate voltage Va. Voltage Va creates load current $I_L$ that flows through primary winding 118. Current $I_L$ creates a magnetic field in primary winding 118 that causes a magnetic field to bleed over to secondary winding 120 within transformer 101. The magnetic field then generates current that results in output voltage Vout.

If circuit 102 fails or becomes unavailable, then bypass circuit 104 takes over. Bypass power supply 106 provides voltage Vb through circuit 104. Voltage Vb generates current Ib that flows through primary winding 105. Like winding 118, winding 105 generates a magnetic field that bleeds over onto secondary winding 120. The magnetic field applied to secondary winding 120 then creates a current that causes output voltage Vout at output 150.

The disclosed embodiments may switch over from circuit 102 to bypass circuit 104 without the need of a switch that delays or interrupts the availability of output voltage Vout at output 150. Further, primary windings 105 and 118 of transformer 101 isolate output 150 from the inputs, whether it is the regular AC voltage input or a bypass one, as bypass circuit 104 is not attached directly to secondary winding 120.

Inductor 114 and capacitor 116 may serve as a filter circuit to filter voltage Vo and generate voltage Va. The filter circuit cleans up the waveform of the voltage in circuit 102 before load current $I_L$ enters primary winding 118. Inductor 114 and capacitor 116 also reduce the ripple that results from rectification of the alternating current coming from inverter 112. Cleaner power then may be provided to output 150 through transformer 101. As shown in FIG. 1, capacitor 116 is connected to a common line, or between phases, while inductor 114 is in line with inverter 112 and winding 118. Values for inductor 114 and capacitor 116 may be adjustable depending on the specifications for power supply 100. Moreover, other filter circuits may be provided along circuit 102, as readily available to those skilled in the art. Other circuitry and devices also may be included within circuit 102 that provides a clean waveform for voltage Va.

Circuit 102 also includes a compensation component that serves to keep voltage Va at levels able to provide a constant output voltage Vout. The compensation component may include a current transformer 130 and a voltage compensator 132. Voltage compensator 132 provides a compensation voltage Vc based on load current $I_L$ detected by current transformer, or detector, 130 as it flows to primary winding 118. Current transformer 130 may be any detector known in the art.

Based on detected load current $I_L$, voltage compensator 132 outputs voltage Vc to adjust the level of voltage Vo coming from inverter 112. Thus, circuit 102 seeks to provide a constant output voltage Vout by adjusting Vo. Over time, load current $I_L$ increases as it flows into inductor 114. As a result, voltage Va may decrease as well which cause a lower voltage to be applied to secondary winding 120, and voltage Vout also will decrease due to the impedance of the transformer. To keep the output voltage constant, voltage compensator 132 provides voltage Vc to compensate for those voltage drops due to load current.

Alternatively, the voltage level applied by AC power supply 108 may drop as it is converted to DC and then back to AC voltage in circuit 102. Voltage Vc also may be used to adjust the voltage applied to primary winding 118 to remain constant by adjusting the voltage for any drops experienced in circuit 102.

Figure 2:
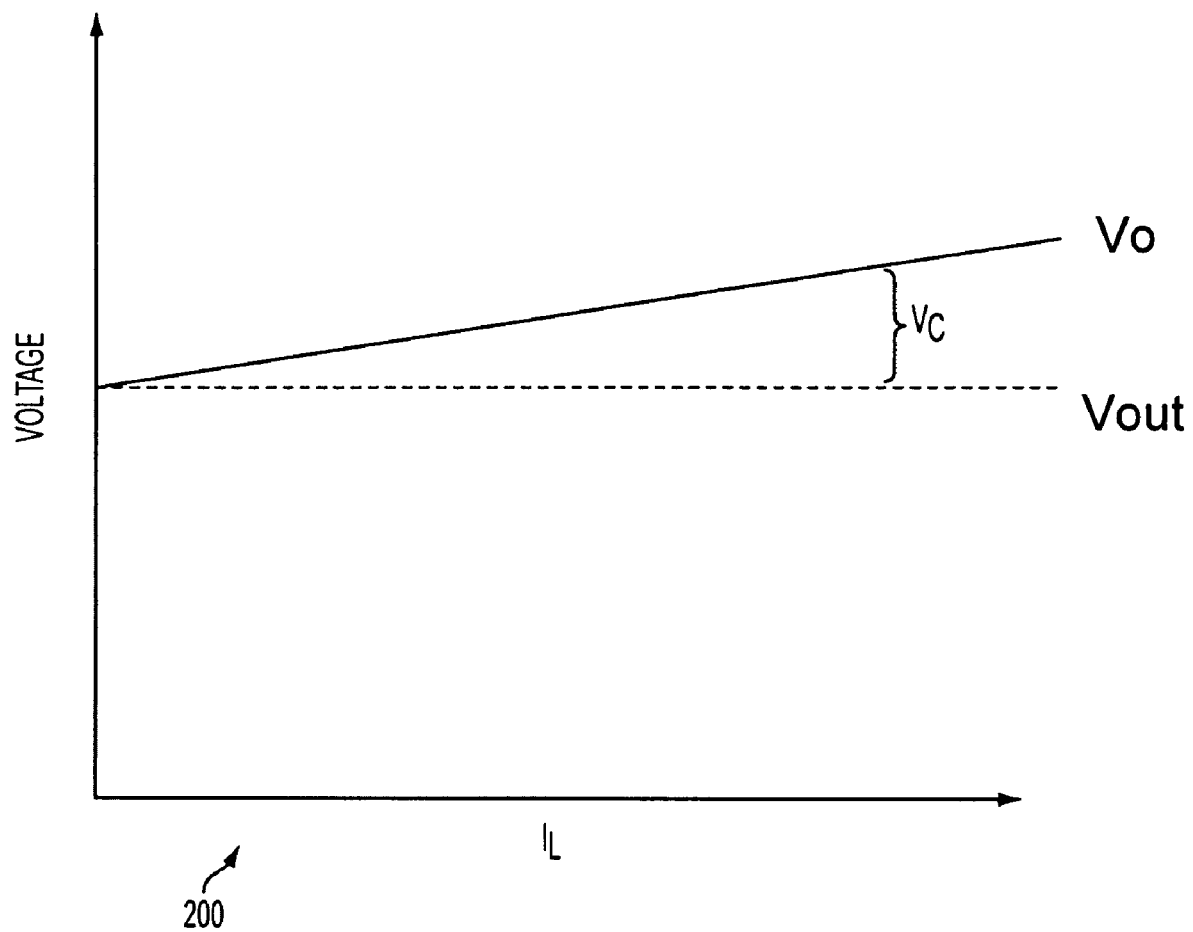
FIG. 2 illustrates a graph showing the relationship between voltages within the inverter circuit and the load current according to the disclosed embodiments.

Referring to FIG. 2, a graph 200 depicts the relationship between voltages Vo and Vout, and load current $I_L$ in this application. The horizontal axis represents the increasing value of load current $I_L$ as it flows into primary winding 118. As load current $I_L$ increases, the value of voltage Vo increases as well as the output voltage remains substantially the same during operations.

The disclosed embodiments employ voltage compensator 132 to adjust voltage Vo to the level shown by the line for voltage Vo. As shown, voltage Vout remains the same even as load current $I_L$ increases. The difference between voltages Va and Vo may be shown by voltage Vc, provided by voltage compensator 132, as disclosed above. Thus, according to the disclosed embodiments, a constant output voltage Vout is provided by power supply 100 because the voltage applied to primary winding 118 remains constant.

Figure 3:
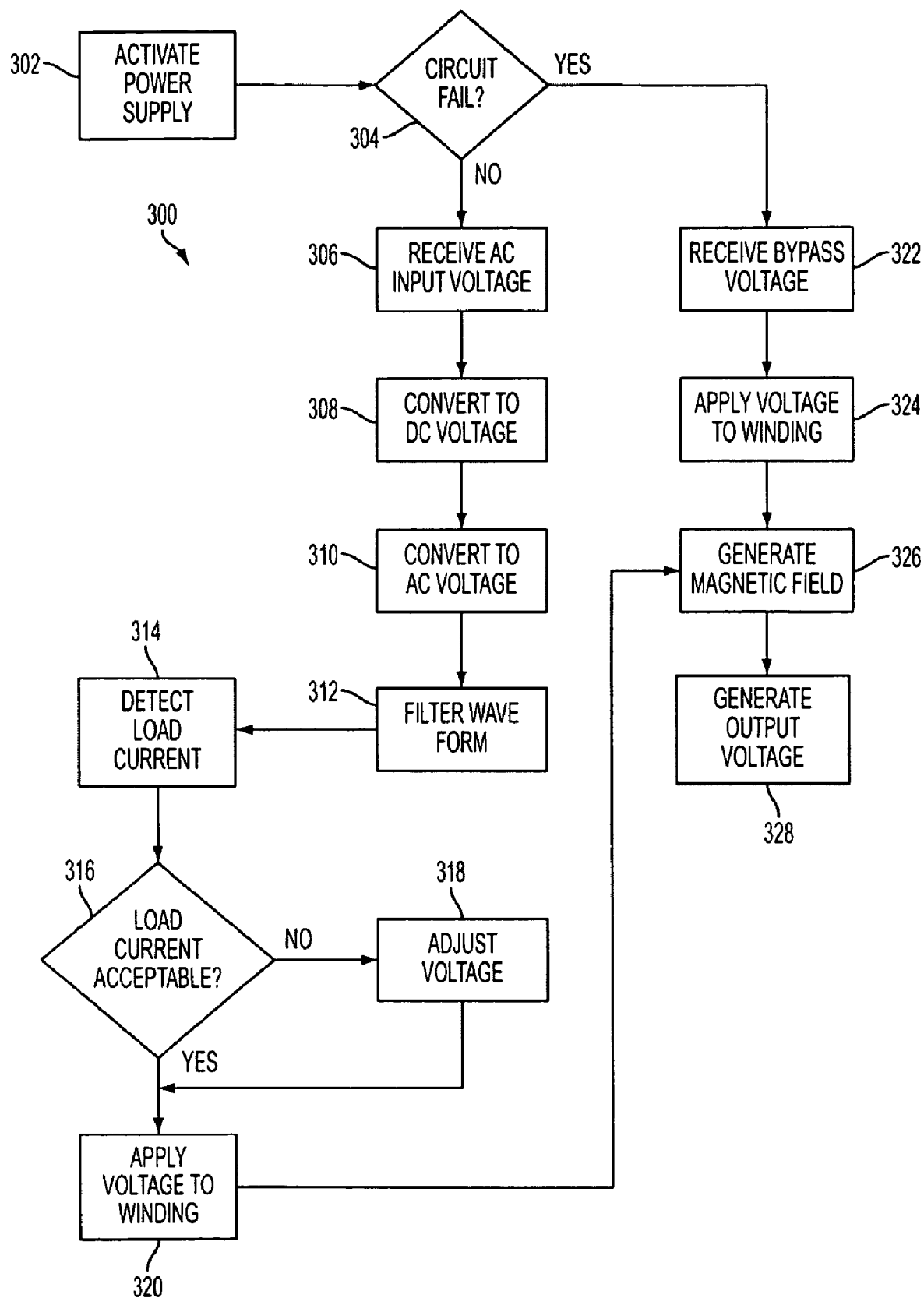
FIG. 3 illustrates a flowchart for providing power via an uninterruptible power supply according to the disclosed embodiments.

FIG. 3 depicts a flowchart 300 for providing power via an uninterruptible power supply according to the disclosed embodiments. For simplicity, reference will be made to the features of the disclosed embodiments shown in FIG. 1 by power supply 100.

Step 302 executes by activating power supply 100 to provide voltage Vout at output 150. Voltage Vout preferably is provided without interruption and at an approximately constant level. Step 304 executes by determining whether the circuit for providing the power has failed, such as inverter circuit 102. Inverter circuit 102 may be determined to be in a failure state if it is not capable of receiving the alternating current input voltage, or if any of its components are inoperable. Moreover, the failure state may exist is a spike occurred that shuts down inverter circuit 102. Thus, the primary circuit for providing power to the secondary side of the isolation transformer has failed.

If step 304 is no, then step 306 executes by receiving the AC input voltage, or voltage Vac. Step 308 executes by converting the AC input voltage to DC voltage, or voltage Vdc. Step 310 executes by converting the DC voltage back to AC voltage, or voltage Vo. This process serves to clean up and rectify the waveform of the voltage applied to primary winding 118 of transformer 101.

Step 312 executes by filtering the waveform of voltage Vo to generate voltage Va. The flowchart may then proceed to step 320 directly or, after a set period of time, certain conditions and the like, proceed to step 314 to determine if the load current flowing into primary winding 118 is acceptable. Thus, step 314 executes by detecting the load current that is used to generate the magnetic field in transformer 101. Step 316 executes by determining whether the load current is acceptable. The load current may be unacceptable if it results in the voltage generated at output 150 being too high or low. In other words, if output voltage Vout fluctuates beyond the level desired, then the load current is unacceptable.

If step 316 is yes, then flowchart 300 proceeds to step 320, as disclosed below. If step 316 is no, then step 318 executes by adjusting voltage applied to primary winding 118 to remain constant. Compensation voltage Vc is applied to adjust voltage Vo to the acceptable level for constant output, or voltage Va.

Step 320 executes by applying voltage Va to primary winding 118 using the load current. Step 320 may be executed directly after filtering the waveform, or after any adjustments are made to the voltage level. Flowchart 300 then proceeds to step 326, as disclosed below.

Referring back to step 304, if inverter circuit 102 fails, then bypass circuit 104 is used to supply the power at output 150 of power supply 100. Thus, step 304 determines a "yes" condition. Step 322 executes by receiving bypass voltage Vb at circuit 104. Step 324 executes by applying voltage Vb to primary winding 105 within transformer 101. Step 324 and step 320 are shown separately because the voltages are not applied to the same winding, but to one of two independent windings within transformer 101. Thus, transformer 101 uses two separate, isolated primary windings 105 and 118.

After execution of step 320 or step 324, step 326 executes by generating a magnetic field within transformer 101. Current flows through the applicable winding to create the magnetic field. The magnetic field bleeds over to secondary winding 118 to generate a current within the winding. As a load is applied to secondary winding 118, voltage Vout is generated, as executed in step 328.

For example, an output voltage Vout of 480 volts may be desired. Thus, the AC input voltage and bypass voltage may be 480 volts at 60 Hertz. Further, voltage Va applied to primary winding 118 may be an AC voltage of 480 volts. Alternatively, transformer 101 may step up or step down voltage levels as desired. Thus, if the input voltage to power supply is 480 volts but the desired output voltage is 208 volts, then the number of windings within primary windings 105 and 118 and secondary winding 120 may be adjusted accordingly.

Further, primary windings 105 and 118 may differ as the voltages available in inverter circuit 102 and bypass circuit 104 differ. For example, the voltage applied to primary winding 118, or voltage Va, may be 300 volts while the bypass voltage is 480 volts. Transformer 101 may step up the voltage to result in an output voltage of 480 volts. Thus, inverter circuit 102 may stay at more manageable or safer levels during normal operations of power supply 100.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. An uninterruptible power supply comprising:
    an isolation transformer having dual primary windings and a secondary winding to supply an output voltage;
    a first winding of the dual primary windings coupled to an inverter circuit that receives an alternating current input voltage; and
    a second winding of the dual primary windings coupled to a bypass circuit that receives a bypass voltage,
    wherein voltage is applied to the second winding upon failure of the inverter circuit to generate the output voltage without interruption,
    wherein the inverter circuit includes a compensation circuit to provide a compensation voltage that maintains the output voltage at an approximately constant level by using feedback from a load current into the first winding of the duel primary windings of the isolation transformer,
    wherein the compensation circuit includes a voltage compensator to generate the compensation voltage based on the load current into the first winding of the duel primary windings of the isolation transformer, wherein said compensation circuit includes a current transformer, wherein said current transformer is directly connected to the output input of the first winding and is also directly connected to the voltage compensator, wherein the voltage compensator is connected to an inverter located within the inverter circuit.

2. The uninterruptible power supply of claim 1, wherein the inverter circuit includes a filter circuit coupled to the first winding.

3. The uninterruptible power supply of claim 1, wherein a number of windings in the secondary winding differs from a number of windings in the first or the second winding.

4. The uninterruptible power supply of claim 1, wherein the bypass voltage differs from the output voltage.

5. The uninterruptible power supply of claim 1, wherein said isolation transformer is a 3-phase isolation transformer.

6. The uninterruptible power supply of claim 5, wherein said duel primary windings have a delta configuration and said secondary windings have a Y configuration.

7. The uninterruptible power supply of claim 1, wherein said feedback used by said voltage compensation circuit comes only from said current transformer.

8. An uninterruptible power supply comprising:

an isolation transformer, wherein the isolation transformer includes a first primary winding coupled to an inverter circuit that receives an alternating current input voltage, a second winding coupled to a bypass circuit that receives a bypass voltage, and a secondary winding;

the inverter circuit includes a diode to generate a direct current voltage and an inverter to convert the direct current voltage to an alternating current voltage that receives a compensation voltage before applied to the first primary winding, wherein the alternating current voltage is cleaner than the alternating current input voltage;

a compensation circuit to detect a load current to the first primary winding and to generate the compensation voltage based on the load current; and an output coupled to the secondary winding to provide an output voltage corresponding to the bypass voltage or the alternating current voltage, wherein said compensation circuit includes a current transformer, wherein said current transformer is directly connected to the output of the first winding and is also directly connected to the voltage compensator, wherein the voltage compensator is connected to an inverter located within the inverter circuit.

9. The uninterruptible power supply of claim 8, wherein the bypass voltage is approximately the same as the output voltage.

10. The uninterruptible power supply of claim 8, wherein the alternating current voltage and the compensation voltage are approximately the same as the output voltage.

11. The uninterruptible power supply of claim 8, wherein the isolation transformer only uses the first primary winding or the second primary winding to generate the output voltage.

12. An isolation transformer comprising:

a first primary winding coupled to an inverter circuit, wherein the inverter circuit provides an alternating current voltage to the first primary winding based on an alternating current input voltage;

a second primary winding coupled to a bypass circuit to provide a bypass voltage; and a secondary winding to generate an output voltage without interruption according to the first primary winding or the second primary winding, wherein the second primary winding is used upon failure of the first primary winding, wherein the inverter circuit includes a compensation circuit to provide a compensation voltage that maintains the output voltage at an approximately constant level by using feedback from a load current into the first winding of the primary windings of the isolation transformer, wherein the compensation circuit includes a voltage compensator to generate the compensation voltage based on the load current into the first winding of the primary windings of the isolation transformer, wherein said compensation circuit includes a current transformer, wherein said current transformer is directly connected to the output of the first winding and is also directly connected to the voltage compensator, wherein the voltage compensator is connected to an inverter located within the inverter circuit.

13. The isolation transformer of claim 12, wherein the output voltage is approximately equal to the alternating current voltage.

14. The isolation transformer of claim 12, wherein the output voltage is stepped up or stepped down from the alternating current voltage or the bypass voltage.

15. A method for supplying power without interruption, the method comprising:

determining whether an inverter circuit is in a failure state;

applying an alternating current voltage using the inverter circuit to a first primary winding of an isolation transformer if the inverter circuit is not in the failure state;

applying a bypass voltage to a second primary winding of the isolation transformer if the inverter circuit is in the failure state;

generating an output voltage using a secondary winding of the isolation transformer based on the alternating current voltage or the bypass voltage, detecting a load current to the first primary winding, adjusting the alternating current voltage applied to the first primary winding with a compensation voltage, wherein the compensation voltage is based on feedback from the detected load current to the first primary winding, wherein said compensation circuit includes a current transformer, wherein said current transformer is directly connected to the output of the first winding and is also directly connected to the voltage compensator, wherein the voltage compensator is connected to an inverter located within the inverter circuit.

16. The method of claim 15, further comprising filtering the alternating current voltage.

17. The method of claim 15, further comprising receiving an alternating current input voltage at the inverter circuit.

* * * * *